(12) United States Patent
Van Huffel

(10) Patent No.: US 7,960,851 B2
(45) Date of Patent: Jun. 14, 2011

(54) POWER GENERATOR AND METHOD FOR GENERATING POWER

(76) Inventor: Phillip L. Van Huffel, Grand Rapids, MI (US)

( * ) Notice: Subject to any disclaimer, the term of this patent is extended or adjusted under 35 U.S.C. 154(b) by 470 days.

(21) Appl. No.: 12/297,793

(22) PCT Filed: Dec. 28, 2006

(86) PCT No.: PCT/US2006/062643
§ 371 (c)(1),
(2), (4) Date: Oct. 20, 2008

(87) PCT Pub. No.: WO2007/123583
PCT Pub. Date: Nov. 1, 2007

(65) Prior Publication Data
US 2009/0066087 A1    Mar. 12, 2009

Related U.S. Application Data

(60) Provisional application No. 60/745,307, filed on Apr. 21, 2006.

(51) Int. Cl.
*F03B 13/00* (2006.01)
(52) U.S. Cl. ................................................. 290/54
(58) Field of Classification Search ............ 290/54
See application file for complete search history.

(56) References Cited

U.S. PATENT DOCUMENTS

| | | |
|---|---|---|
| 705,967 A | 7/1902 | Roeh |
| 4,313,059 A | 1/1982 | Howard |
| 4,500,827 A * | 2/1985 | Merritt et al. ............. 322/3 |
| 5,324,169 A | 6/1994 | Brown |
| 5,349,819 A * | 9/1994 | Margittai ............ 60/398 |
| 6,020,653 A * | 2/2000 | Woodbridge et al. ..... 290/53 |
| 2005/0073154 A1* | 4/2005 | Dudley .................. 290/54 |
| 2011/0042956 A1* | 2/2011 | Frye ....................... 290/54 |

FOREIGN PATENT DOCUMENTS

| | | |
|---|---|---|
| AT | 340337 B | 12/1997 |
| DE | 448788 C | 8/1927 |
| EP | 977343 A1 * | 2/2000 |
| EP | 1085642 A | 3/2001 |
| FR | 56434 A | 12/1923 |
| GB | 2034413 A | 6/1980 |
| GB | 2143284 A * | 2/1985 |
| GB | 2210107 A * | 6/1989 |
| JP | 63150472 A * | 6/1988 |
| JP | 08135558 A * | 5/1996 |
| JP | 09256941 A * | 9/1997 |
| JP | 11044288 A * | 2/1999 |
| WO | 2005038241 A | 4/2005 |
| WO | WO 2009103332 A1 * | 8/2009 |

* cited by examiner

*Primary Examiner* — Joseph Waks
(74) *Attorney, Agent, or Firm* — McGarry Bair PC

(57) ABSTRACT

A power generator for use in a unidirectional flowing fluid has a fixed part and a movable part, the movable part is mounted on the fixed part for reciprocal movement with respect to the fixed part between first and second positions. A valve element on the movable part is adapted to move between open and closed positions for relatively unimpeded and impeded flow. A valve actuation mechanism is connected to the valve element to move the valve element to the closed position when the movable element reaches the first position and to move the valve element to the open position when the movable element reaches the second position. An electrical generator is coupled to the fixed part and the moveable part and is adapted to generate electrical energy when the movable part moves between the first and second positions.

22 Claims, 10 Drawing Sheets

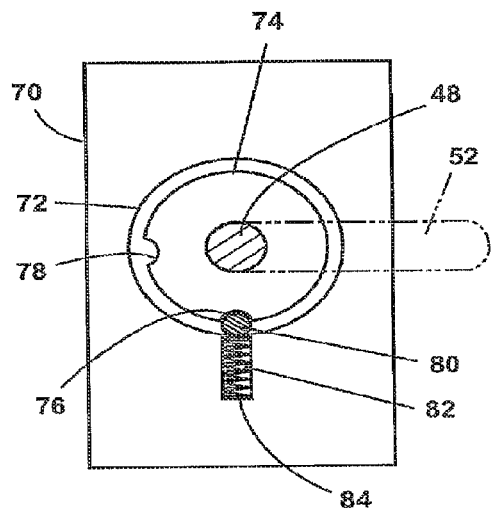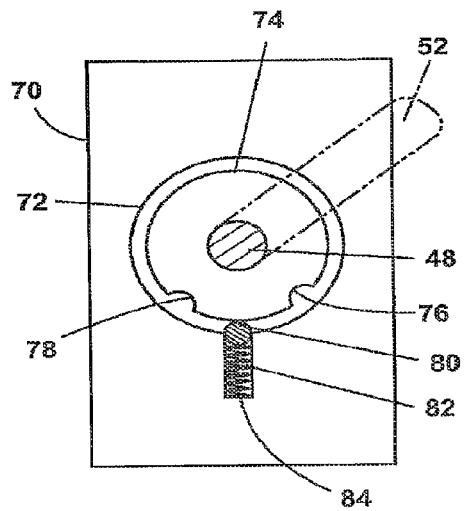
Fig. 5A    Fig. 5B
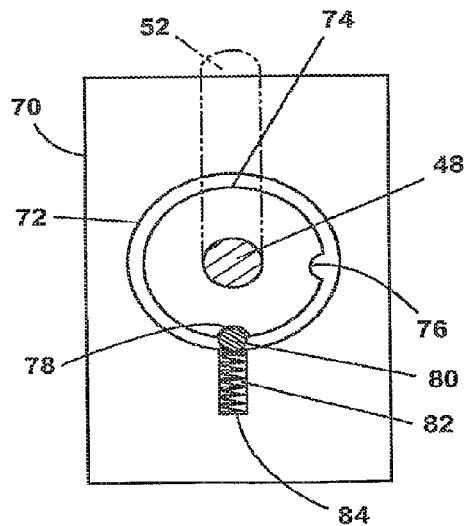
Fig. 5C

POWER GENERATOR AND METHOD FOR GENERATING POWER

CROSS-REFERENCE TO RELATED APPLICATIONS

This application claims priority on International Application No. PCT/US2006/062643, filed Dec. 28, 2006, which claims the benefit of U.S. Provisional Patent Application No. 60/745,307, filed Apr. 21, 2006, both of which are incorporated herein in their entirety.

BACKGROUND OF THE INVENTION

1. Field of the Invention

This invention relates generally to power generation. In one of its aspects, the invention relates to a power generator that uses a unidirectional flowing fluid for generation of electrical energy. In another of its aspects, the invention relates to a system for generating electrical energy using a unidirectional flowing fluid. In another of its aspects, the invention relates to a method for generating electrical energy using a unidirectional flowing fluid.

2. Description of the Related Art

Power generators utilizing natural or renewable source of energy, such as water or air, have been heretofore proposed. Many of these generators use turbines that are turned as water or air impinges on the blades of the turbine. The rotational movement of the turbine is used to turn an electric generator or other similar device. The most common hydroelectricity generators require large dams and reservoirs to be built to produce electricity. These constructions can also adversely affect the environment by disrupting the natural flow of water and the surrounding ecosystem. Other power generators utilize tidal or wave action and wind as a source of renewable energy. However, these power generators are unreliable as both wave action and wind energy are not constant or predictable and thus produce a varying amount of electricity within a given time frame.

These and other related types of power generators are disclosed in one or more of the following references:

SUMMARY OF THE INVENTION

According to the invention, a power generator for use in a unidirectional flowing fluid comprises a fixed part and a movable part, wherein the fixed part is adapted to be fixed with respect to a flowing fluid, and the movable part is mounted to the fixed part for reciprocal movement with respect to the fixed part between first and second positions. A valve element is carried on the movable part and is adapted to move between an open position at which fluid flow with respect to the movable part is relatively unimpeded and a closed position in which the fluid flow with respect to the movable part is impeded to thereby move the movable part to the second position. A valve actuation mechanism is connected to the valve element to move the valve element to the closed position when the movable element reaches the first position and to move the valve element to the open position when the movable element reaches the second position. An electrical generator is coupled to the fixed part and the moveable part and is adapted to generate electrical energy when the movable part moves between the first and second positions.

The movable part and the fixed part can take a number of different configurations that include, for example, a pair of telescoping tubes or the movable part can be a shaft and the fixed part can be a guide for the shaft.

The electrical generator can also take a variety of forms that include the generation of electrical energy with the relative linear movement of the movable part with respect to the fixed part. For example, at least one coil winding can be mounted on one of the movable and fixed parts and at least one magnet on the other of the movable and fixed parts so that electrical current is generated as the magnet passes the coil winding. Alternatively, the movable part can be connected to an arm which is coupled to an eccentric coupling on a pulley/wheel/disk that can turn a rotating generator. Still further, the movable part can be connected to an arm which acts in a ratcheted movement to turn a rotating generator as the arm moves with the movable part when the valve is in the closed position.

In one embodiment of the invention, a biasing member is mounted between the fixed part and the movable part for biasing the movable part toward the first position. The biasing means can comprise, for example, a tension spring or a compression spring.

In another embodiment of the invention, the return of the movable member to the first position is accomplished by coupling two power generators together in parallel with the movable members coupled together, for example, with a cable and pulley, but with the movable members 180 degrees out of phase.

The valve element can take a number of forms so long as it performs the function of opening and closing a passage for flow of the flowing fluid. For example, the valve element can be a butterfly valve, a ball valve, a clamshell valve, a slide valve, or a vane.

The valve actuation mechanism can likewise take a number of forms so long as it performs the function of opening and closing the valve at the appropriate position of the movable element in the first and second positions. For example, the valve actuation member can be a simple mechanical devise such as a lever on the valve element and mechanical stop blocks on the fixed part. Alternatively, the valve actuation member can be electromechanical such as a motor that is connected to the valve element, sensing elements that detect the movable part in the first and second positions and a controller connected to the sensing elements and to the motor. Still further, the valve actuation member can be wholly electronic, such as the use of a solenoid operated valve element in lieu of the motor in the electromechanical valve actuator.

In a preferred embodiment of the invention, a detent releasably retains the valve member in at least one of the open and closed positions, preferably in both the open and closed position.

Further according to the invention, a system for generating power in a unidirectional moving fluid comprises any of the power generators described above positioned within the unidirectional moving fluid wherein the fixed and movable parts are arranged so that the direction of reciprocal movement of the movable part is aligned with the direction of movement of the moving fluid and the first position of the movable part is at an upstream portion of the moving fluid and the second position of the movable part is at a downstream portion of the moving fluid.

The unidirectional moving fluid can be a number of sources that include a water stream, pressurized steam, for example, from a steam generator, or wind.

The electrical generator of the power generating system can be connected to an individual user or can be connected to a power grid.

The power generating system according to the invention can further include a second power generator as described above positioned within the unidirectional moving fluid wherein the movable parts of the respective power generators are coupled together for movement with each other but 180 degrees out of phase so that the movable part of the first power generator moves to the first position as the movable part of the second power generator moves to the second position.

Still further according to the invention, a method for generating power comprises positioning any of the power generators described above into a unidirectional moving fluid wherein the fixed and movable parts are arranged so that the direction of reciprocal movement of the movable part is aligned with the direction of movement of the moving fluid and the first position of the movable part is at an upstream portion of the moving fluid and the second position of the movable part is at a downstream portion of the moving fluid and taping electrical energy from the electrical generator.

The power generator according to the invention can produce a reliable amount of electricity and utilizes a renewable source of energy without disrupting the environment in which the power generator is located.

BRIEF DESCRIPTION OF THE DRAWINGS

In the drawings:

FIG. 5A-5C are sectional views taken along line 5A-5A of FIG. 4.

DESCRIPTION OF THE PREFERRED EMBODIMENT

Figure 1:
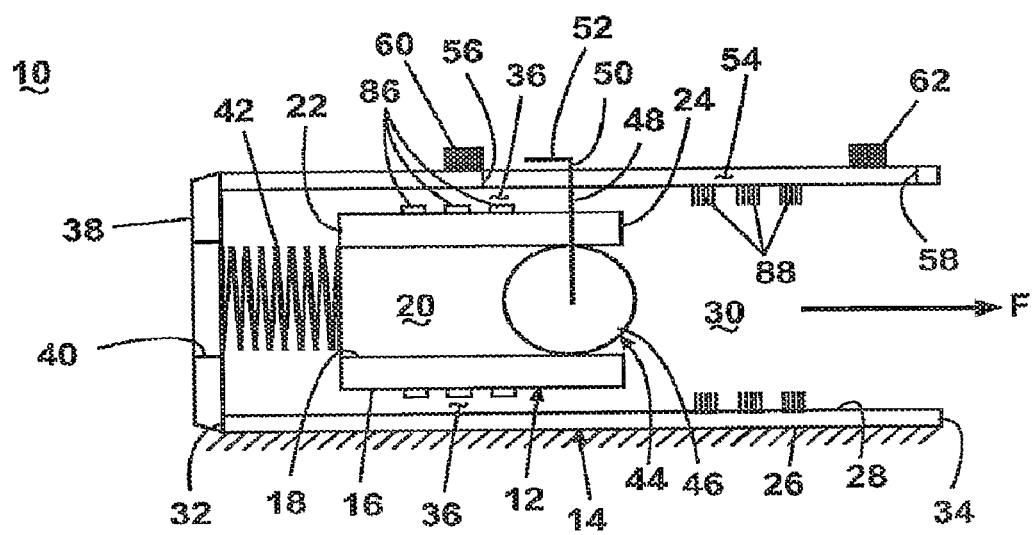
FIG. 1 is a side sectional view of a first embodiment of a power generator comprising an inner and outer tube according to a first embodiment of the invention.
Figure 2:
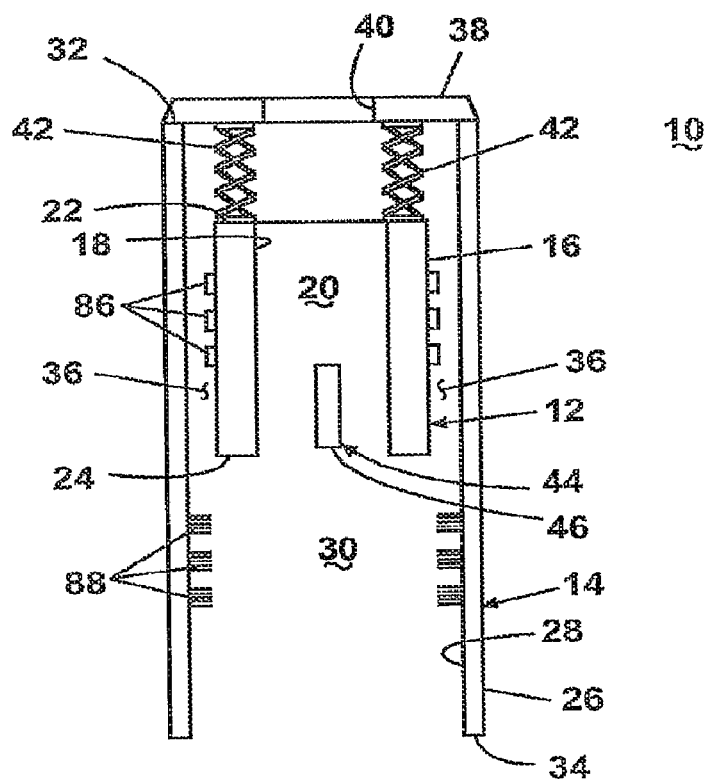
FIG. 2 is a top sectional view of the power generator from FIG. 1.

A power generator according to the invention utilizes a flowing fluid to generate electricity. The fluid may be water, steam, or air. Referring to FIGS. 1-2, a power generator 10 according to one embodiment of the present invention is illustrated, and comprises a pair of concentric tubes 12, 14. The inner tube 12 is substantially hollow, with an outer surface 16, an inner surface 18, a centrally extending cavity 20, a first open end 22 and a second open end 24. The outer tube 14 is substantially hollow, with an outer surface 26, an inner surface 28, a centrally extending cavity 30, a first open end 32, and a second open end 34. The inner tube 12 is received concentrically within the outer tube 14, preferably with a generally annular gap 36 between the outer surface 16 of the inner tube 12 and the inner surface 28 of the outer tube 14 to allow the tubes 12, 14 to move linearly relative to one another without friction.

As illustrated, the tubes 12, 14 are have a cylindrical cross-section. However, the tubes 12, 14 may have any polygonal cross-section shape, such as, but not limited to, triangular, square, rectangular, hexagonal, elliptical, and ovoid. The tubes 12, 14 can be constructed from any suitable material that does not corrode when exposed to water or other elements of the environment in which the power generator 10 is utilized. Examples of suitable materials are stainless steel, non-ferrous metals, most plastics, glass, and/or concrete.

The tubes 12, 14 are attached to one another at or near their respective first ends 22, 32. The first end 32 of the outer tube is fixedly mounted to plate 38 having at least one aperture 40 for fluid to flow therethrough. At least one tension spring 42 is attached between the plate 38 and the inner tube 12. More preferably, two tension springs 42 are attached between the mounting plate and the first end 22, generally spaced 180° from each other on the circumference of the inner tube 12.

The inner tube 12 is further provided with a valve 44 for selectively occluding the cavity 20. More specifically, the valve 44 is moveable between a first or open position wherein fluid may enter first end 22, pass through cavity 20, and exit through second end 24, and a second or closed position wherein fluid is substantially prevented from exiting through second end 24, although it is within the scope of the invention for small amount of fluid to pass through the second end 24 when the valve 44 is in the closed position. In the embodiment shown in FIG. 1, the valve 44 is a butterfly valve comprising a valve body 46 that is received within cavity 20. The valve body 46 is sized to substantially occlude the cavity 20 in the closed position (shown in FIG. 7). A valve stem 48 is attached to the valve body 46 and defines the axis about which the butterfly valve 44 pivots. A portion 50 of the valve stem 48 extends exteriorly of both tubes 12, 14 and a generally orthogonal position arm 52 extends from the portion 50.

Other suitable devices for selectively opening and closing the second end include other internal devices such as a ball check valve, and external devices such as a "clam-shell" valve or vanes having two or more parts that open outwardly or that slide in a direction perpendicular to the flow direction of the fluid or a device that inflates and deflates.

Figure 3:
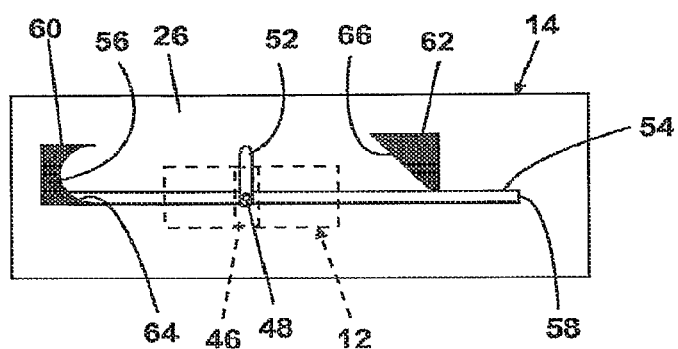
FIG. 3 is a top view of the power generator from FIG. 1, illustrating a valve switching mechanism for the power generator.
Figure 4:
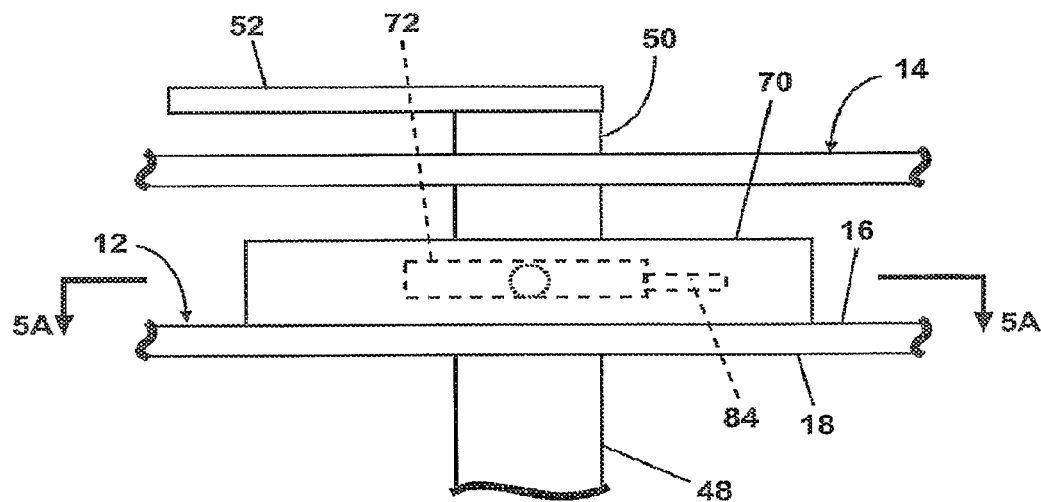
FIG. 4 is a side view of a valve position retaining device for the power generator.

The outer tube 14 is further provided with a device for limiting the movement of the inner tube 12. Referring to FIG. 3, the outer tube 14 has an elongated slot 54 having first and second ends 56, 58, respectively, that slidingly receive the valve stem 48. The movement of the inner tube 12 relative to the outer tube 14 is limited to a distance defined by the length of the slot 54. Thus, the first end 56 defines a maximum upstream position of the inner tube 12 and the second end 58 defines a maximum downstream position of the inner tube 12. The slot 54 preferably has a width that is equal to or slightly greater than the width or diameter of the valve stem 48. This relationship helps to prevent the inner tube 12 from drifting out of alignment with the outer tube 14.

The power generator 10 further has a valve switch that opens and closes the butterfly valve 44. The valve switch can be any suitable mechanical or electrical mechanism. Mechanical mechanisms include, but are not limited to levers, springs, and gears. Referring to FIG. 3, a mechanical valve switching mechanism comprising a pair of stop blocks 60, 62 mounted on the outer surface 26 of the outer tube 14. The first stop block 60 is positioned near or at the first end 56 of slot 54 and has an concavely curved surface 64 that is positioned to receive the position arm 52 as the valve stem 48 approaches the first end 56. The curved surface 64 forces the valve body 46 from the open position to the closed position, as will be described in more detail below. The second stop block 62 is positioned at or near the second end 58 of slot 54 and has an angled surface 66 that receives the position arm 52 as the valve stem 48 approaches the second end 58. The angled surface 66 forces the valve body 46 from the closed position to the open position, as will be described in more detail below.

Referring to FIGS. 4 and 5A-5C, the butterfly valve 44 has a valve position retainer 68 or detent that helps releasably retain the butterfly valve 44 in the open or closed position. The retainer 68 comprises a retaining block 70 fixedly attached to the inner tube 12. Preferably, the retainer 68 is mounted to the outer surface 16 of the tube, but can also be attached to the inner surface 18. The retaining block 70 has an inner disc-shaped cavity 72 that retains a rotatable valve stop ring 74 having a pair of dimples 76, 78 formed in the outer periphery of the stop ring 74. The dimples 76, 78 are spaced 90° on the circumference of the stop ring 74 and are sized to alternately receive a ball bearing 80. The ball bearing 80 is biased by a spring 82 received in a spring cavity 84 formed in the retaining block 70 and in communication with the disc-shaped cavity 72. The stop ring 74 is fixedly attached to the valve stem 48, such the stop ring 74 moves with the valve stem. When the butterfly valve 44 is in the closed position, illustrated in FIG. 5A in which the valve arm 52 is horizontal with respect to the orientation of the page, the ball bearing 80 is received in dimple 76. When the butterfly valve 44 is in the open position, illustrated in FIG. 5C in which the valve arm 52 is vertical with respect to the orientation of the page, the ball bearing 80 is received in dimple 78. As the butterfly valve 44 moves from the closed position to the open position, or vice versa, the ball bearing 80 is forced at least partially into the spring cavity 84 by the outer periphery of the stop ring 74 and compresses the spring 82. When the ball bearing 80 reaches either dimple 76, 78, the spring 82 forces the ball bearing into the dimple 76, 78 to retain the butterfly valve in the respective closed or open position. Thus, the dimples 76, 78 and the spring biased ball bearings 80 form a detent mechanism for releasably retaining the butterfly valve 44 in the open or closed position.

The inner and outer tubes 12, 14 further have a means for generating electrical current. In the illustrated embodiment, one or more magnets 86 are mounted on the outer surface 16 of the inner tube 12. The magnets 86 are preferably annular and extend around the outer circumference of the inner tube 12. The outer tube 14 has one or more coil windings 88 on its inner surface 28. As is commonly known, by passing the magnets 86 through the magnetic field of the coil windings 88, electrical current can be induced in the coil windings. In another embodiment (not shown), the power generator can have a conventional electric generator attached, whereby the linear motion of the power generator is converted to rotational motion to rotate the electric generator.

Figure 6:
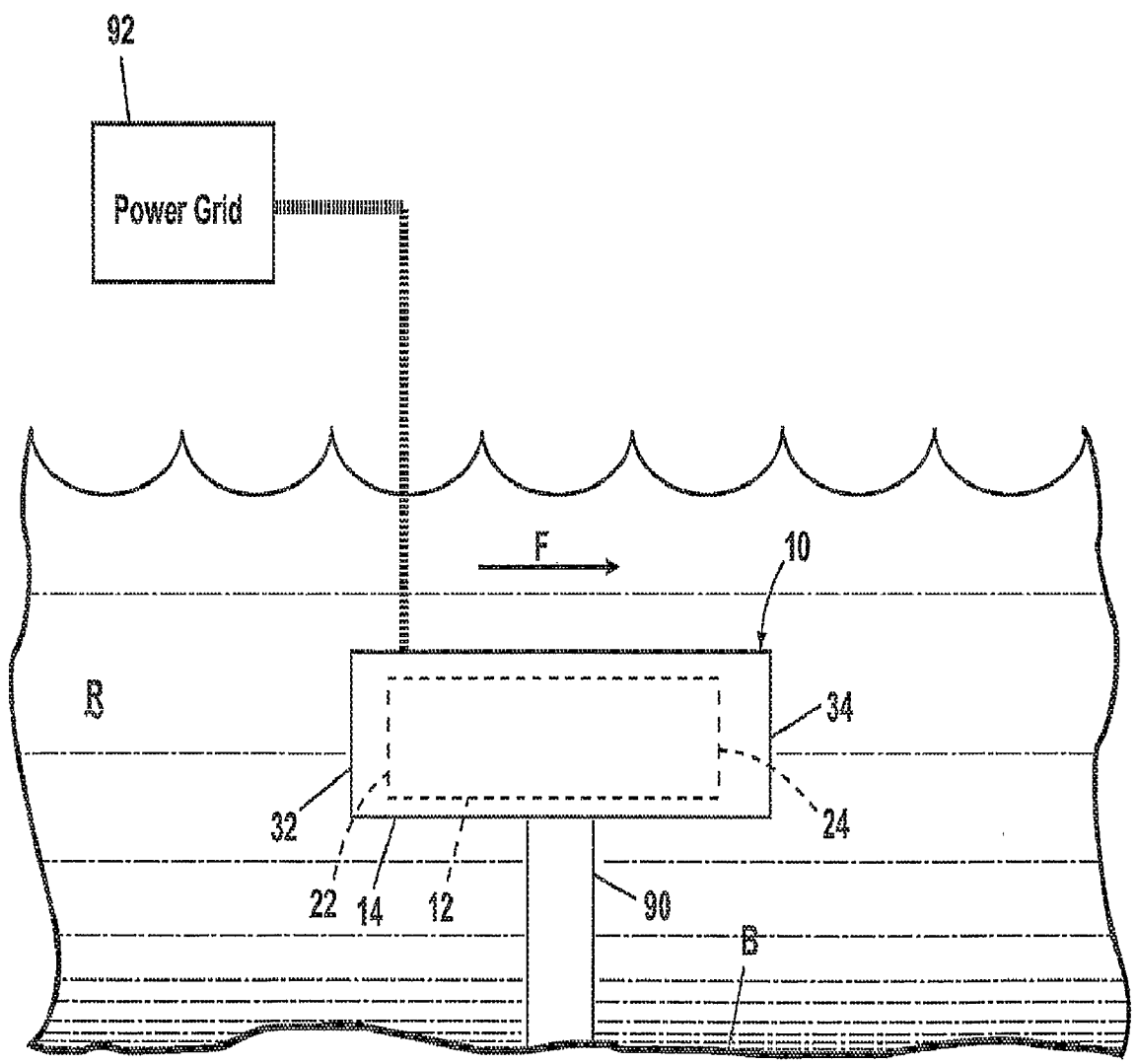
FIG. 6 is a schematic illustration of the power generator from FIG. 1 positioned in a unidirectionally flowing river.

The power generator 10 is preferably positioned in a body of water having unidirectional flow, such as a river, stream, waterfall, or dam. The term "unidirectional" is used to convey that most fluid is flowing along a path defined along a single direction. Referring to FIG. 6, the power generator 10 is positioned in a river R so that the longitudinal axes of the tubes 12, 14 are substantially parallel to the direction of water flow, indicated by arrow F, and the first ends 22, 32 are positioned upstream relative to the second ends 24, 34. It is also contemplated that the power generator 10 can also be mounted within a river with the longitudinal axes of the tubes 12, 14 canted with respect to the direction of fluid flow F. In either case, the flow rate of the river is fairly constant and thus will produce a fairly constant amount of electricity.

The power generator 10 can further have a means for anchoring the power generator 10 within the body of water, such as a support 90 extending to the river bed B or tether extending to a fixed structure (not shown). The power generator 10 can also be attached to a mobile object, such as a boat, that would create the effect of flowing water even in a substantially still body of water.

The power generator 10 can also utilize air as a source of energy. The power generator 10 can be mounted in an air stream. The air stream can be a naturally occurring air stream such as wind. The power generator 10 can also be attached to a mobile vehicle, such as automobile or airplane, that would create the effect of flowing air without needing a naturally occurring air stream.

The power generator 10 can also utilize steam as a source of energy. For example, the steam that exits the turbines of a power plant could be ducted so that it used as the motive force for the power generator 10 instead of being directly exhausted to a condenser.

A power grid 92 or other suitable power receptor can be operably coupled to the power generator 10 to receive and/or distribute the electric power produced by the power generator. A number of power generators 10 can be mounted in juxtaposed position in a moving fluid body and attached to a single power grid 92.

Figure 7:
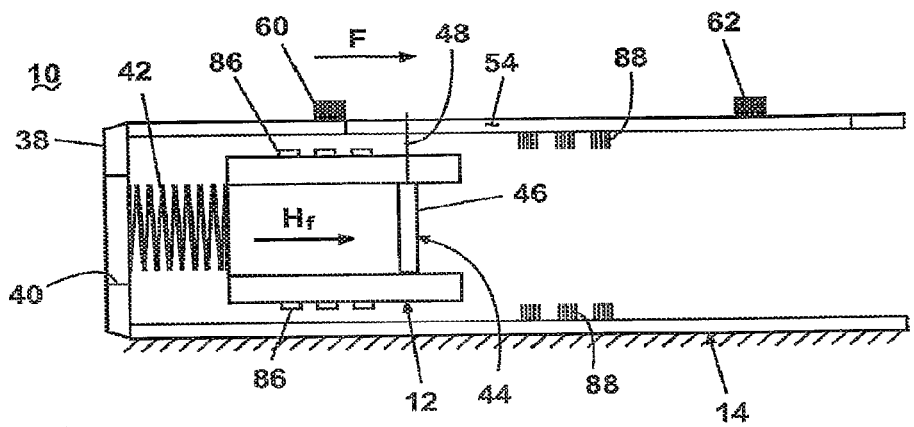
FIG. 7 is a side sectional view of the power generator from FIG. 1, with a valve in the inner tube in a closed position and the inner tube in an upstream position.
Figure 8A:
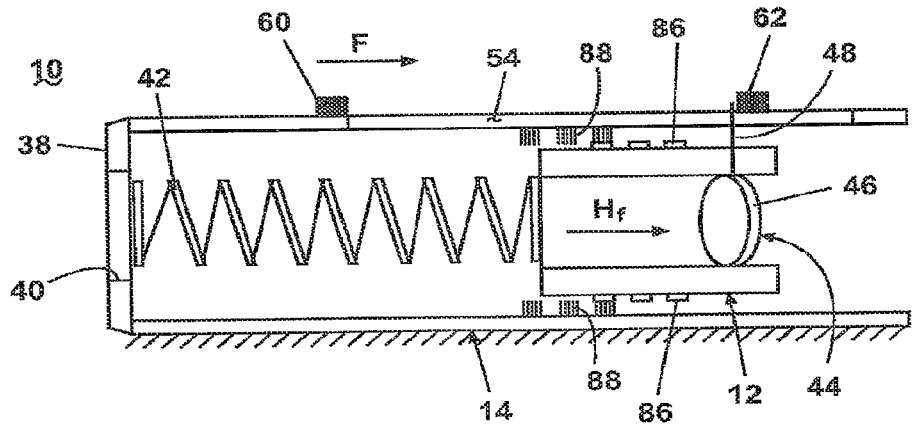
FIG. 8A is a view similar to FIG. 7, with the valve in the inner tube in a position between open and closed and the inner tube in a downstream position.
Figure 8B:
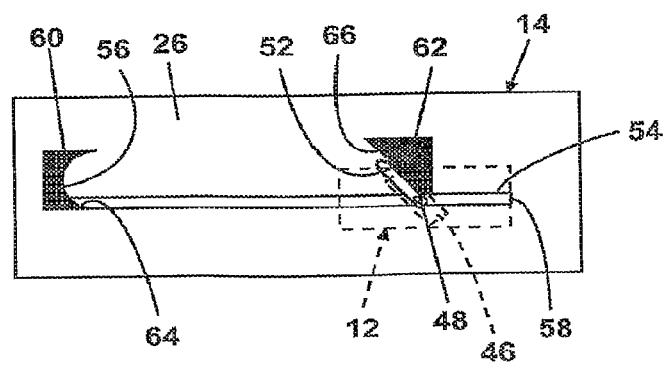
FIG. 8B is a top view of the power generator of FIG. 8A.
Figure 9A:
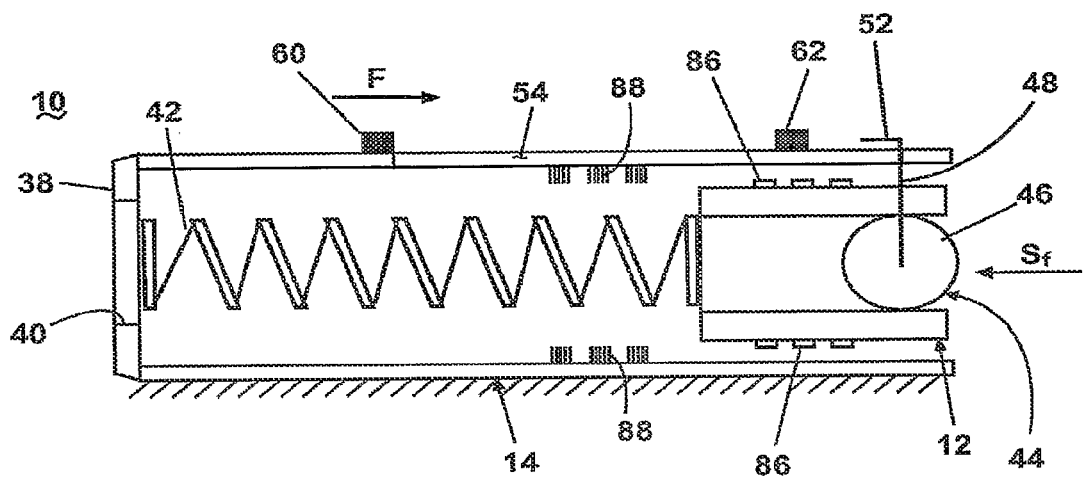
FIG. 9A is a view similar to FIG. 7, with the valve in the inner tube in an open position and the inner tube in a further downstream position.
Figure 9B:
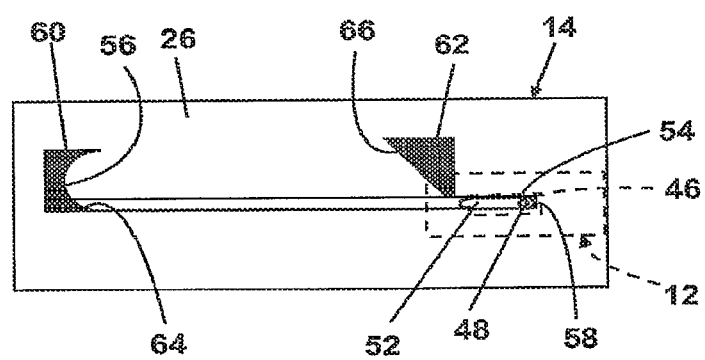
FIG. 9B is a top view of the power generator of FIG. 9A.
Figure 10A:
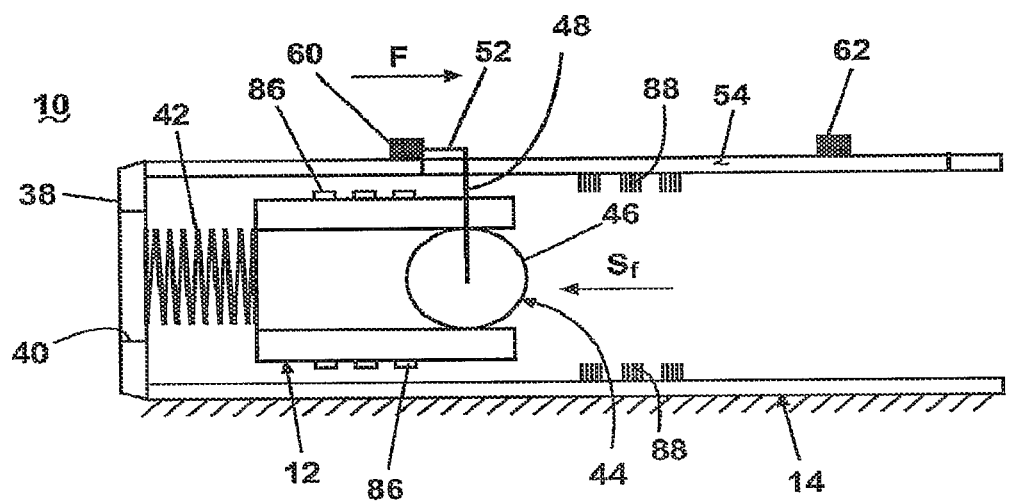
FIG. 10A is a view similar to FIG. 7, with the valve in the inner tube in an open position and the inner tube in an upstream position.
Figure 10B:
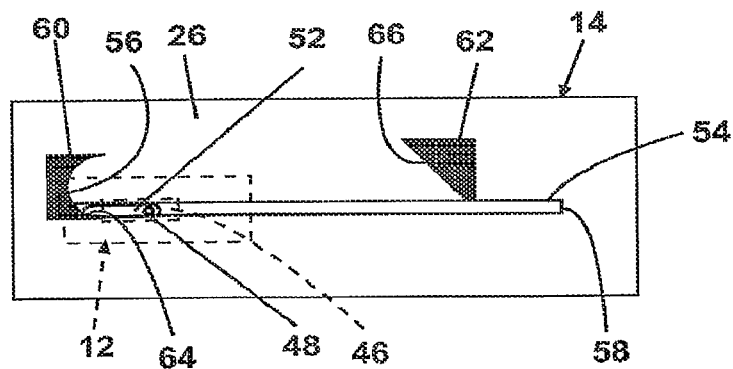
FIG. 10B is a top view of the power generator from FIG. 10A.
Figure 11:
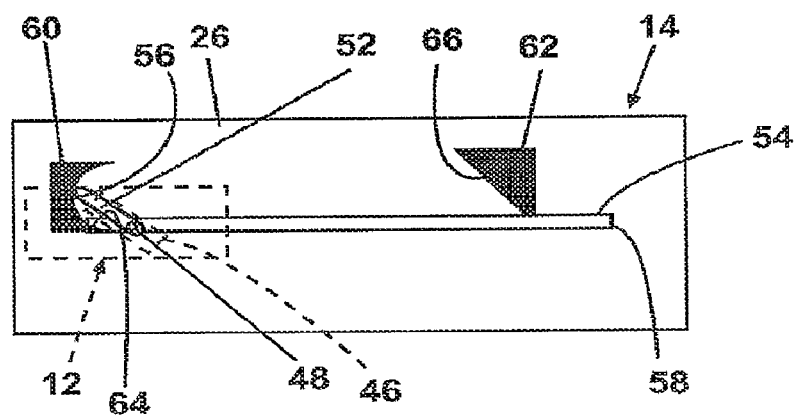
FIG. 11 is a top view of the power generator, with the valve in the inner tube in a position between open and closed.
Figure 12:
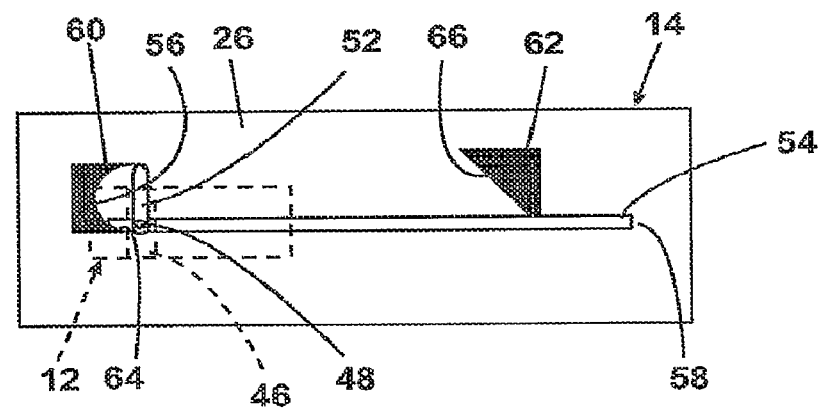
FIG. 12 is a top view of the power generator, with the valve in the inner tube in a closed position and the inner tube in an upstream position.

Referring to FIGS. 7-10, in operation, the power generator 10 is fixedly positioned in a unidirectional flowing fluid, where the direction of fluid flow is indication by arrow F. More specifically, the outer tube 14 or plate 38 is fixedly attached to a surface that is fixed with respect to the flowing fluid so that the inner tube 12 can move relative to the outer tube 14. Referring to FIG. 7, with the butterfly valve 44 in the closed position, hydraulic or pneumatic pressure created by the flowing fluid against the valve body 46 is greater than the tension force of the springs 42, and the inner tube 12 will begin to move downstream with respect to the outer tube 14. As the inner tube 12 approaches a maximum downstream position, illustrated in FIG. 8A, the butterfly valve 44 is opened by the stop block 62 engaging the position arm 52 to move the valve body 46 to the open position. Specifically, when the valve arm 52 reaches the stop block 62, the valve arm 52 is engaged by the angled surface 66 and is pivoted counterclockwise with respect to the orientation of the page, as shown in FIG. 8B, even as the inner tube 12 continues to move downstream. When the inner tube 12 reaches the maximum downstream position, as illustrated in FIGS. 9A-9B, the valve arm 52 is generally horizontal with respect to the orientation of the page, as shown in FIG. 9B and the valve body 46 is completely open. The hydraulic or pneumatic pressure on the inner tube 12 is greatly reduced with the butterfly valve 44 in the open position, such that the tension force of the springs 42 is now greater. Accordingly, the inner tube 12 will begin to move upstream. The inner tube 12 will continue to move upstream until the stop block 60 engages the position arm 52, as illustrated in FIGS. 10A-10B. When the valve arm 52 reaches the stop block 60, the valve arm 52 is engaged by the curved surface 64 and is pivoted clockwise with respect to the orientation of the page, as shown in FIG. 11, even as the inner tube 12 continues to move upstream. When the inner tube 12 reaches the maximum upstream position, as illustrated in FIG. 12, the valve arm 52 is generally vertical with respect to the orientation of the page, and the valve body 46 is completely closed, thus completing one cycle of power generation. The cycles will continue as long as there is sufficient force from a fluid to move the inner tube 12.

As the magnets 86 pass through the magnetic field of the coil windings 88, electrical current is generated in the coil windings 88. As discussed above, a power grid 92 can be operably coupled to the power generator 10 to receive and/or distribute the electric current produced by the power generator.

Figure 13:
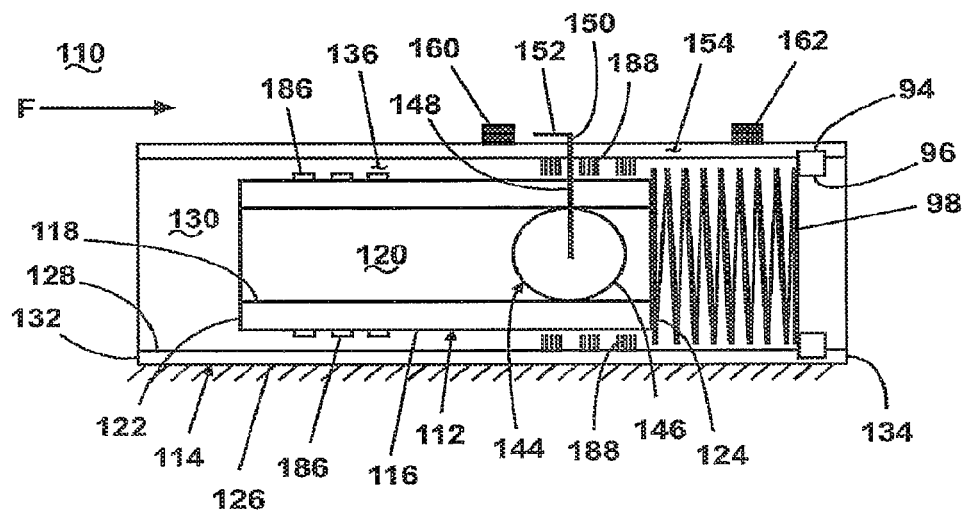
FIG. 13 is a side sectional view of a second embodiment of a power generator according to the invention.
Figure 14:
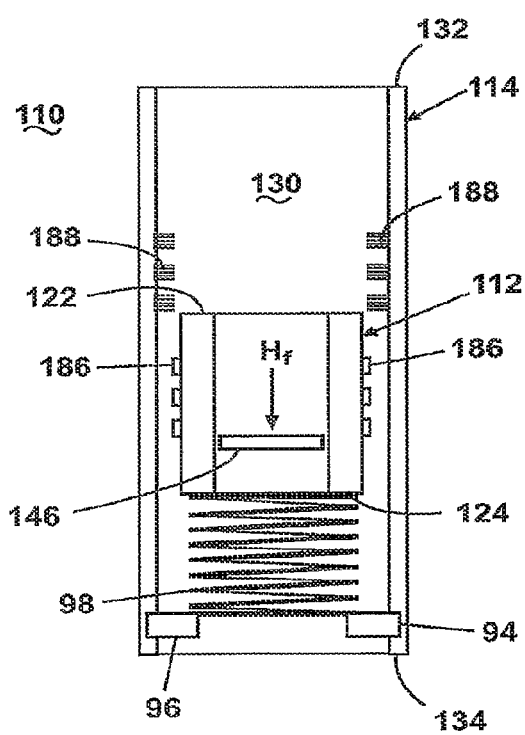
FIG. 14 is a top sectional view of the power generator from FIG. 11, with a valve in a closed position.
Figure 15:
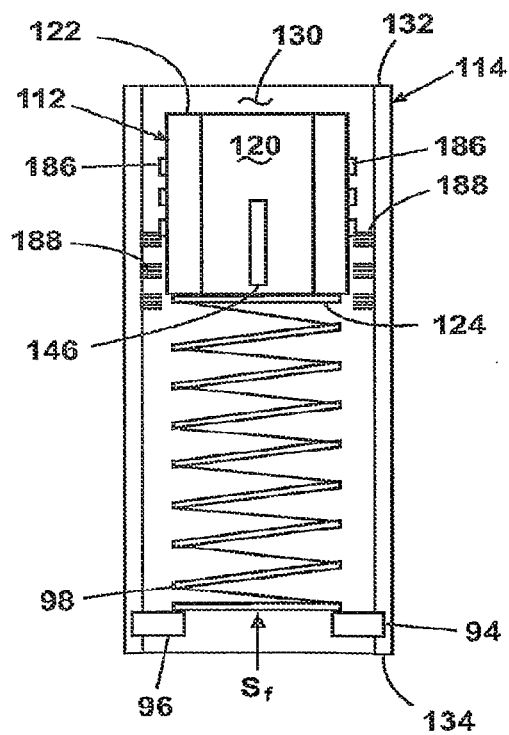
FIG. 15 is a top sectional view of the power generator from FIG. 11, with a valve in an open position.

A second embodiment of the power generator 110 is illustrated in FIGS. 13-15, in which like elements bear the same reference numeral increased by 100. The outer tube 114 is provided with an annular groove 94 near or at its second end 134. The groove 94 retains an O-ring 96. A compression spring 98 is received between the O-ring and the second end 124 of the inner tube 112.

The operation of the power generator 110 is substantially the same as for the power generator 10, with the following exceptions. As the inner tube 112 moves downstream with the butterfly valve 144 in the closed position, the spring 98 is compressed. When the butterfly valve 144 is opened, the compression spring 98 will uncoil and force the inner tube 112 upstream.

Figure 16:
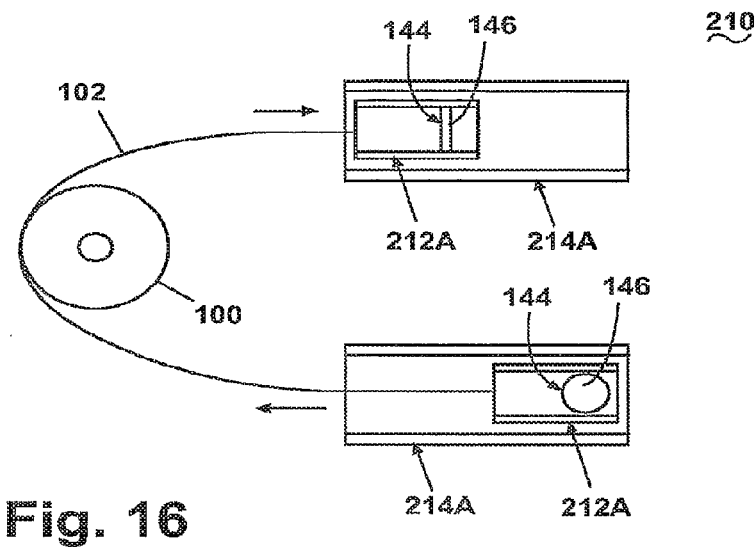
FIG. 16 is a schematic illustration of a third embodiment of a power generator according to the invention.

A third embodiment of the power generator is illustrated in FIG. 16, where like elements bear the same reference numeral increased by 200. The power generator 210 comprises a first pair of tubes 212A, 214A, and second pair of tubes 212B, 214B that operate on opposite cycles. While not specifically shown, each pair of tubes comprises the components discussed previously for tubes 12, 14. The outer tubes 214A, 214B are mounted in a fixed position with respect to the flowing fluid and the inner tubes 212A, 212B are mechanically coupled together such that the movement of the first inner tube 212A in a downstream direction is synchronized with movement of the second inner tube 212B in an upstream direction, and vice versa in a cyclic pattern. One suitable mechanical coupling is illustrated in FIG. 16, where a fixed pulley 100 is and a cable 102 are attached between the inner tubes 212A, 212B. The inner tubes 212A, 212B can also be coupled using a gear transmission assembly. As an alternative to the third embodiment illustrated, the inner tubes 212A, 212B can be fixedly mounted, and the outer tubes 214A, 214B can be mechanically coupled and move relative to the inner tubes 212A, 212B.

Figure 17:
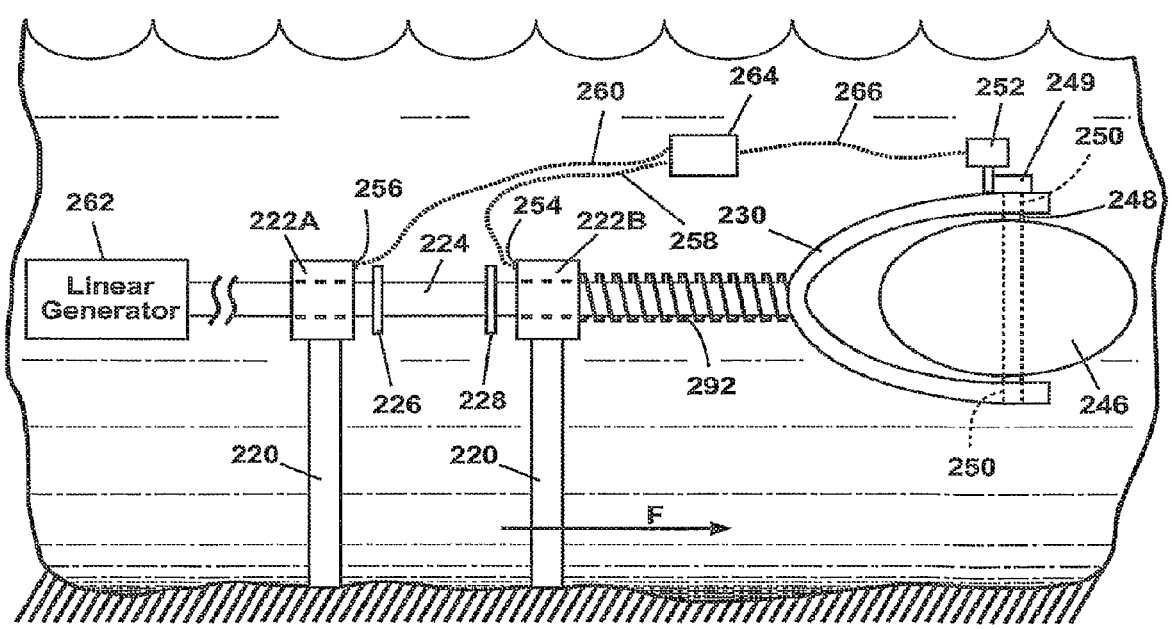
FIG. 17 is a schematic illustration of a fourth embodiment of a power generator according to the invention.

Referring now to FIG. 17, there is shown a fourth embodiment of the invention. Supports 220 are fixed to a stream bottom and mounted at an upper portion pillow blocks 222A and 222B in which an elongated shaft 224 is slidably received. Rings 226 and 228 are fixedly mounted in spaced relationship on the shaft 224 between the pillow blocks 222A and 222B. Limit switches 254 and 256 are mounted on the pillow blocks and positioned to contact the rings 226 and 228. A yoke 230 is mounted to one end of the shaft 224 and pivotally supports a valve body 246 on a valve stem 248 in journals 250. A gear motor 250 is mounted on one leg of the yoke 230 and has a splined output shaft which is adapted to mesh with a gear 249 non-rotatably mounted to the valve stem 248. The gear motor is connected to a controller 264 through an electrical line 266 to control the movement of the motor 252 and thus position the valve body in an open position illustrated in FIG. 17 and a closed position perpendicular to the position illustrated in FIG. 17. The controller 264 is connected to the limit switches 254 and 256 through electrical lines 258 and 260, respectively, to control the gear motor 252. The gear motor 252 is a reversible motor which can drive the gear 49 to rotate the valve stem 248 and thus the valve body 246 through an angle of about 90° degrees about the rotational axis of the valve stem 248. A tension spring 242 is coiled around the shaft 224 between the pillow block 222 and the yoke 230 and is fixedly secured at one end to the pillow block 222 and at the other end to the yoke 230.

The distal end of the shaft 224 is slidably received in a linear generator which has coils that are in close proximity to the shaft 224. Permanent magnets (not shown) are mounted on the distal end of shaft 224 in close proximity to the coils (not shown) that are within the linear generator 262. Electrical energy is generated by the relative movement of the magnets with respect to the coil in the manner discussed above with respect to the first three embodiments of the invention. The linear generator has output wires (not shown) that are connected to a power grid in the manner disclosed above.

In operation, the power generator of FIG. 17 is positioned within a stream or other moving fluid body that has a direction of flow indicated by the arrow F. The supports 220 are anchored to the bottom of the stream so that the shaft 224 is parallel to the flow of the stream. When the valve body 246 is in the position illustrated in FIG. 17, the tension spring draws the yoke 230 and the shaft 224 upstream (to the left as viewed in FIG. 17) until the ring 226 contacts the limit switch 256. During this movement, magnets on the distal end of the shaft 224 will pass in close proximity to coils in the linear generator 252 to generate electrical current. When the ring 226 reaches its left most position in FIG. 17, the limit switch will close (or open) and the controller 264 will generate a control signal to the gear motor 252 to rotate the valve stem 248 and the valve body 246 90° degrees so that the plane of the valve body 246 is perpendicular to the flow of fluid (perpendicular to the plane of the drawing). At that time, the stream will force the shaft 224 downstream (to the right as illustrated in the drawing) against the tension in the spring 242 until the ring 228 reaches the limit switch 254 at the downstream pillow block 222. During the movement of the shaft 224, the linear generator 262 will generate further electricity due to the movement between the magnets on the distal end of shaft 224 past the coils in the linear generator 262. The limit switch 254 will close (or open) and, as a result, the controller 264 will then generate a control signal to the gear motor 252 to rotate the valve stem 248 and thus the valve body 246 in a reverse direction so that the valve body 246 is parallel to the flow of the stream as illustrated in FIG. 17. At that time, the tension in the tension spring 242 will draw the shaft 224 upstream until the ring 226 meets the upstream pillow block 222A and the limit switche 256. The cycle then begins again.

While the invention has been specifically described in connection with certain specific embodiments thereof, it is to be understood that this is by way of illustration and not of limitation. Reasonable variation and modification are possible within the foregoing description and drawings without departing from the spirit of the invention which is defined by the appended claims.

What is claimed is:

1. A power generator for use in a unidirectional flowing fluid as a source of energy comprises;
   a fixed part comprising a first tube adapted to be fixed with respect to a flowing fluid;
   a movable part comprising a second tube telescopically coupled with the first tube for reciprocal movement with respect to the first tube between first and second positions;
   a valve element carried on the movable part and adapted to move between an open position at which fluid flow with respect to the movable part is relatively unimpeded and a closed position in which the fluid flow with respect to the movable part is impeded to thereby move the movable part to the second position;
   a valve actuation mechanism connected to the valve element to move the valve element to the closed position when the movable part reaches the first position and to move the valve element to the open position when the movable part reaches the second position; and
   an electrical generator coupled to the fixed part and the moveable part and adapted to generate electrical energy when the movable part moves between the first and second positions.

2. A power generator according to claim 1 wherein the electrical generator comprises at least one coil winding on one of the movable and fixed parts and at least one magnet on the other of the movable and fixed parts, whereby electrical current is generated as the magnet passes the coil winding.

3. A power generator according to claim 1 and further comprising a biasing member between the fixed part and the movable part for biasing the movable part toward the first position.

4. A power generator according to claim 3 wherein the biasing element is a tension spring.

5. A power generator according to claim 3 wherein the biasing element is a compression spring.

6. A power generator according to claim 1 wherein the valve element is a butterfly valve.

7. A power generator according to claim 1 wherein the valve element is a ball valve.

8. A power generator according to claim 1 wherein the valve element is a clamshell valve.

9. A power generator according to claim 1 wherein the valve element is a slide valve.

10. A power generator according to claim 1 wherein the valve element is a device that inflates or deflates.

11. A power generator according to claim 1 wherein the valve actuation mechanism comprises a motor that is connected to the valve element, sensing elements that detect the movable part in the first and second positions and a controller connected to the sensing elements and to the motor.

12. A power generator according to claim 1 and further comprising a detent for releasably retaining the valve member in at least one of the open and closed positions.

13. A power generator according to claim 1 wherein the linear movement of the movable part is converted to rotary motion and the electrical generator is a rotary motor.

14. A system for generating power in a unidirectional moving fluid comprising; a power generator according to claim 1 positioned within the unidirectional moving fluid wherein the fixed and movable parts are arranged so that the direction of reciprocal movement of the movable part is aligned with the direction of movement of the moving fluid, the first position of the movable part is at a relative upstream position of the moving fluid and the second position of the movable part is at a relative downstream position of the moving fluid.

15. A system for generating power according to claim 14 wherein the moving fluid is a water stream.

16. A system for generating power according to claim 14 wherein the moving fluid is steam.

17. A system for generating power according to claim 14 wherein the moving fluid is wind.

18. A system for generating power according to claim 14 and further comprising a power grid connected to the electrical generator.

19. A system for generating power according to claim 14 and further comprising a second power generator positioned within the unidirectional moving fluid wherein the movable parts of the respective power generators are coupled together for movement with each other but 180 degrees out of phase so that the movable part of the first power generator moves to the first position as the movable part of the second power generator moves to the second position.

20. A method for generating power comprising:
    positioning a power generator according to claim 1 into a unidirectional moving fluid wherein the fixed and movable parts are arranged so that the direction of reciprocal movement of the movable part is aligned with the direction of movement of the moving fluid and the first position of the movable part is at an upstream portion of the moving fluid and the second position of the movable part is at a downstream portion of the moving fluid; and
    taping electrical energy from the electrical generator.

21. A power generator for use in a unidirectional flowing fluid as a source of energy comprises;
    a fixed part adapted to be fixed with respect to a flowing fluid;
    a movable part mounted on the fixed part for reciprocal movement with respect to the fixed part between first and second positions, the movable part comprising a shaft, and the fixed part comprising a guide for the shaft;
    a valve element carried on the movable part and adapted to move between an open position at which fluid flow with respect to the movable part is relatively unimpeded and a closed position in which the fluid flow with respect to the movable part is impeded to thereby move the movable part to the second position;
    a valve actuation mechanism connected to the valve element to move the valve element to the closed position when the movable part reaches the first position and to move the valve element to the open position when the movable part reaches the second position; and
    an electrical generator coupled to the fixed part and the moveable part and adapted to generate electrical energy when the movable part moves between the first and second positions.

22. A power generator for use in a unidirectional flowing fluid as a source of energy comprises;
    a fixed part and a movable part, the fixed part is adapted to be fixed with respect to a flowing fluid, and the movable part is mounted on the fixed part for reciprocal movement with respect to the fixed part between first and second positions;
    a valve element carried on the movable part and adapted to move between an open position at which fluid flow with respect to the movable part is relatively unimpeded and a closed position in which the fluid flow with respect to the movable part is impeded to thereby move the movable part to the second position;

a valve actuation mechanism comprising a lever on the valve element and at least two mechanical stop blocks on the fixed part that cooperate to move the valve element to the closed position when the movable part reaches the first position and to move the valve element to the open position when the movable part reaches the second position; and an electrical generator coupled to the fixed part and the moveable part and adapted to generate electrical energy when the movable part moves between the first and second positions.

* * * * *